(12) United States Patent
Hija

(10) Patent No.: US 10,179,502 B2
(45) Date of Patent: Jan. 15, 2019

(54) RAIN SHIELD SYSTEM

(71) Applicant: Mohamed Hija, Los Angeles, CA (US)

(72) Inventor: Mohamed Hija, Los Angeles, CA (US)

( * ) Notice: Subject to any disclaimer, the term of this patent is extended or adjusted under 35 U.S.C. 154(b) by 0 days.

(21) Appl. No.: 15/403,456

(22) Filed: Jan. 11, 2017

(65) Prior Publication Data
US 2018/0194206 A1 Jul. 12, 2018

(51) Int. Cl.
B60J 5/04 (2006.01)

(52) U.S. Cl.
CPC .......... B60J 5/0494 (2013.01); B60J 5/0468 (2013.01)

(58) Field of Classification Search
CPC .............................. B60J 5/0494; B60J 4/0468
See application file for complete search history.

(56) References Cited

U.S. PATENT DOCUMENTS

| D263,984 S | 4/1982 | Moss | |
|---|---|---|---|
| 5,476,302 A | 12/1995 | Ronci | |
| 6,044,856 A * | 4/2000 | Cano | B60J 5/0494 135/88.01 |
| 6,948,766 B1 | 9/2005 | Capote et al. | |
| 7,604,281 B1 * | 10/2009 | Raynor | B60J 5/0494 135/88.07 |
| 7,819,458 B2 | 10/2010 | Raynor | |
| 8,079,629 B2 | 12/2011 | Raynor | |
| 9,090,153 B1 | 7/2015 | Boyd | |
| 9,139,072 B2 * | 9/2015 | Henry | B60J 5/0494 |
| 9,302,570 B2 | 4/2016 | Yeom et al. | |

FOREIGN PATENT DOCUMENTS

WO    WO2009094838    6/2009

* cited by examiner

Primary Examiner — D Glenn Dayoan
Assistant Examiner — Melissa A Black

(57) ABSTRACT

A rain shield system for inhibiting rain from entering a vehicle includes a vehicle that has a doorway and a door. A shield is coupled to the vehicle. The shield is selectively positioned in a deployed position having the shield extending between the doorway and the door when the door is opened. In this way the shield inhibits rain from entering an interior of the vehicle.

5 Claims, 5 Drawing Sheets

RAIN SHIELD SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to shield devices and more particularly pertains to a new shield device for inhibiting rain from entering a vehicle.

BRIEF SUMMARY OF THE INVENTION

An embodiment of the disclosure meets the needs presented above by generally comprising a vehicle that has a doorway and a door. A shield is coupled to the vehicle. The shield is selectively positioned in a deployed position having the shield extending between the doorway and the door when the door is opened. In this way the shield inhibits rain from entering an interior of the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
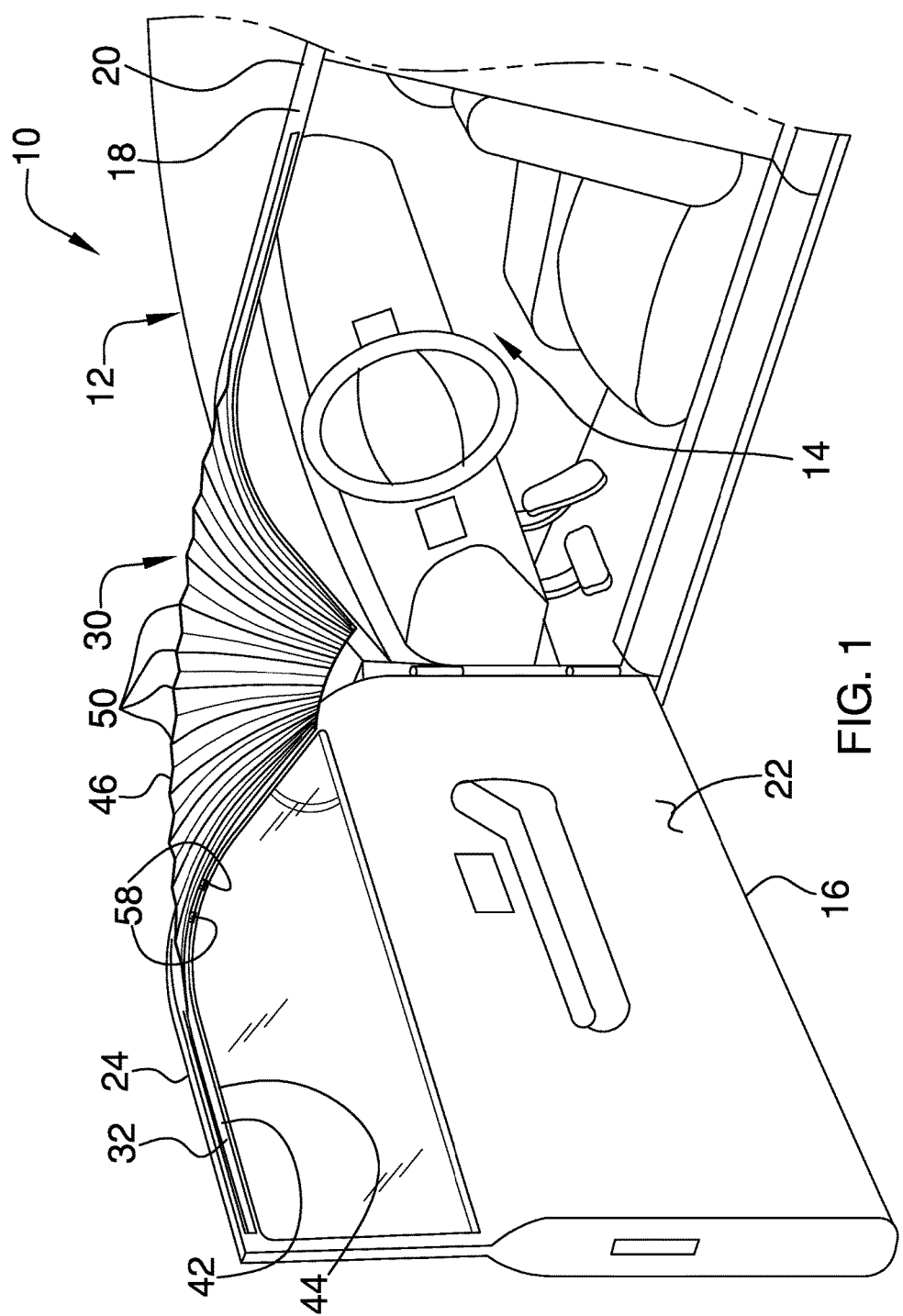
FIG. 1 is a perspective view of a rain shield system according to an embodiment of the disclosure showing a shield being positioned in a deployed position.
Figure 2:
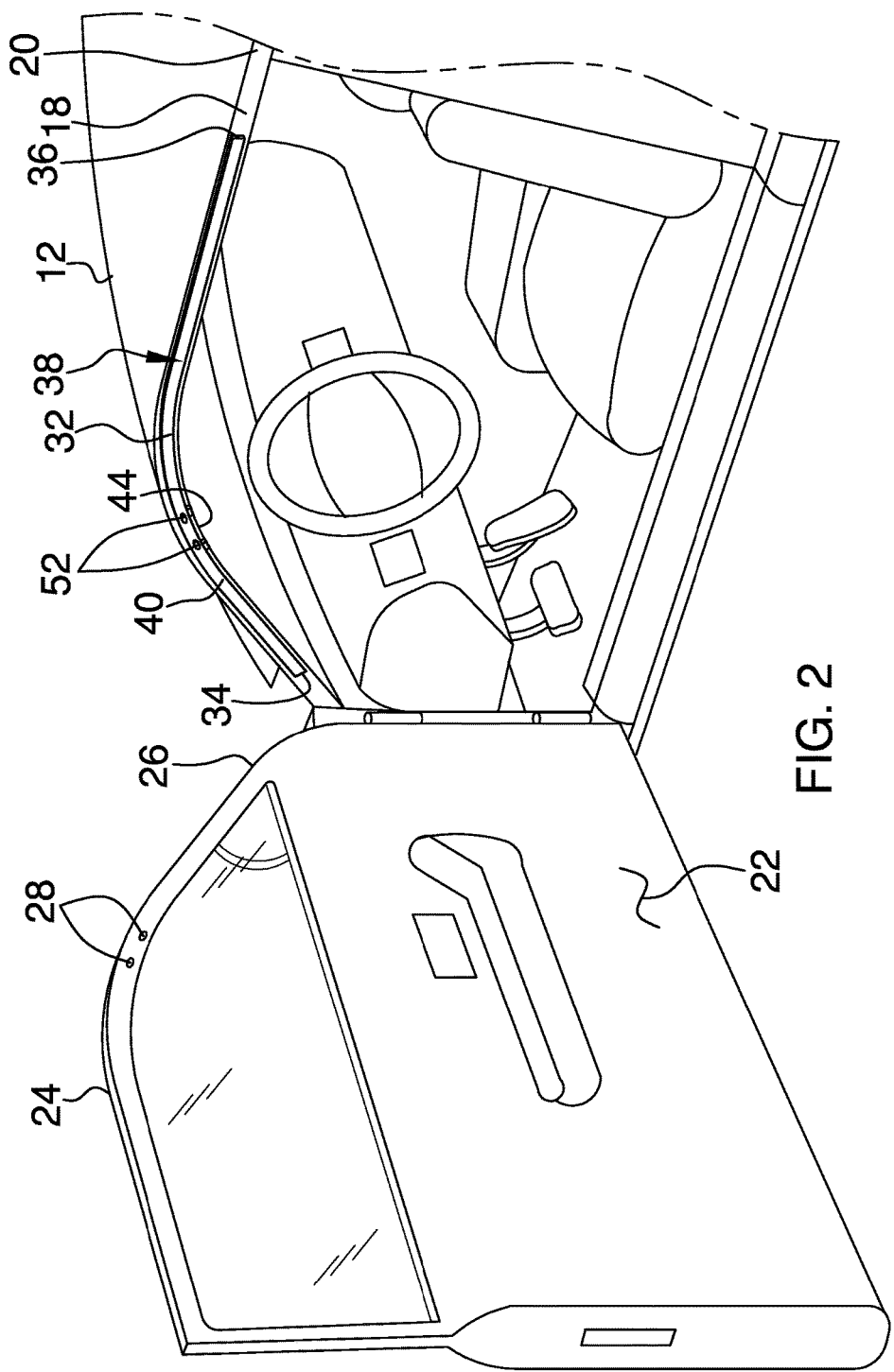
FIG. 2 is a perspective view of an embodiment of the disclosure showing a shield in a stored position.
Figure 3:
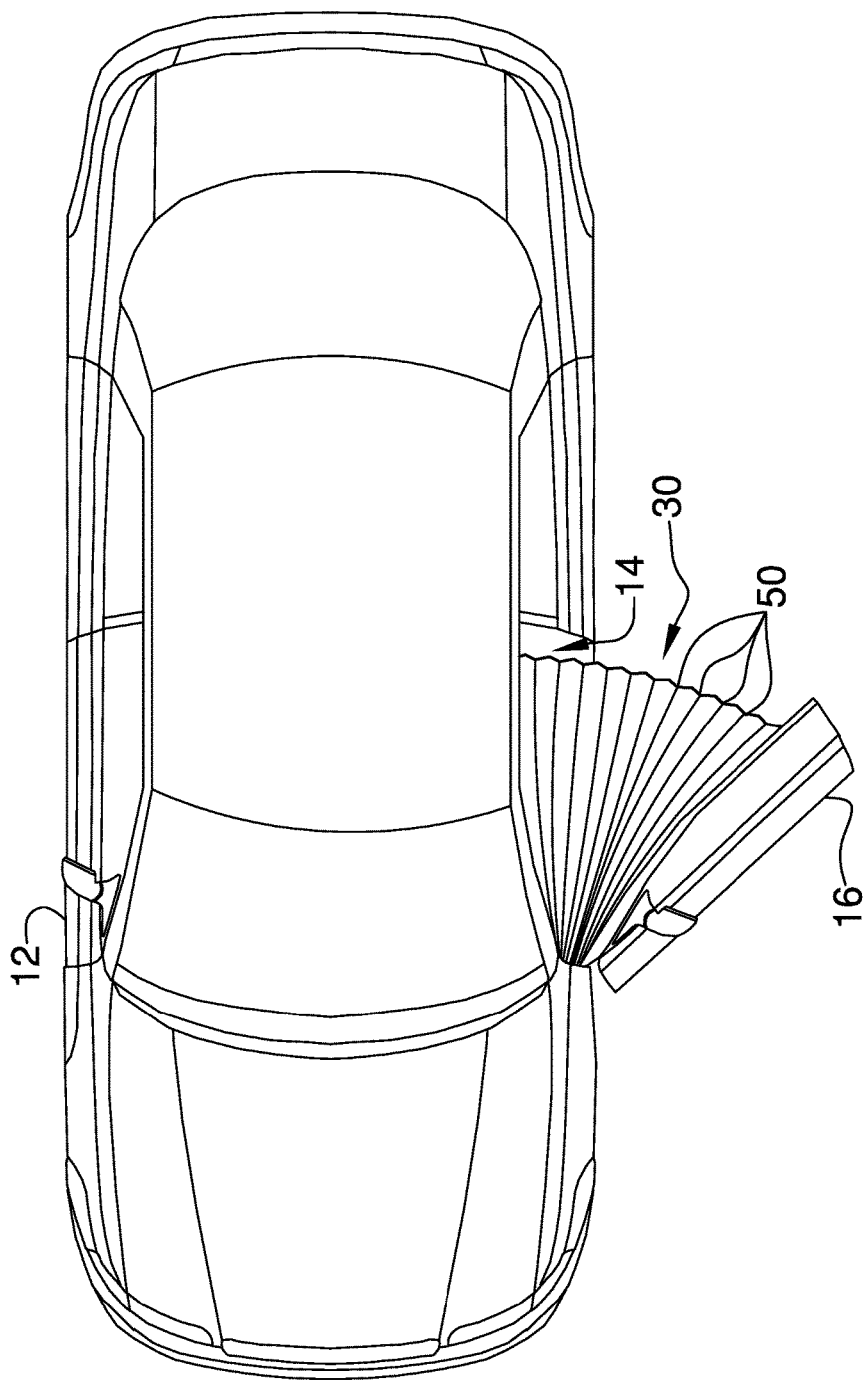
FIG. 3 is a top view of an embodiment of the disclosure.
Figure 4:
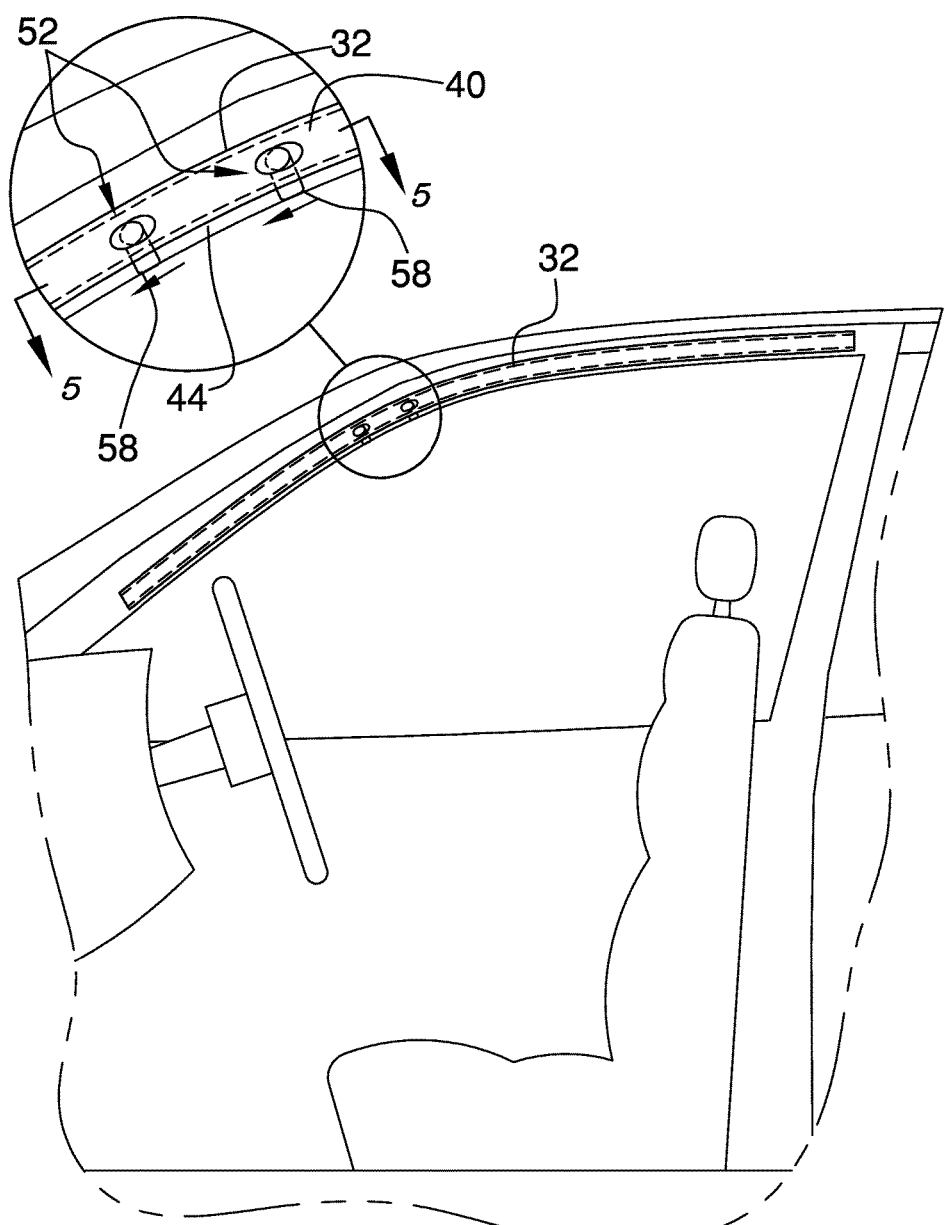
FIG. 4 is a left side view of an embodiment of the disclosure.
Figure 5:
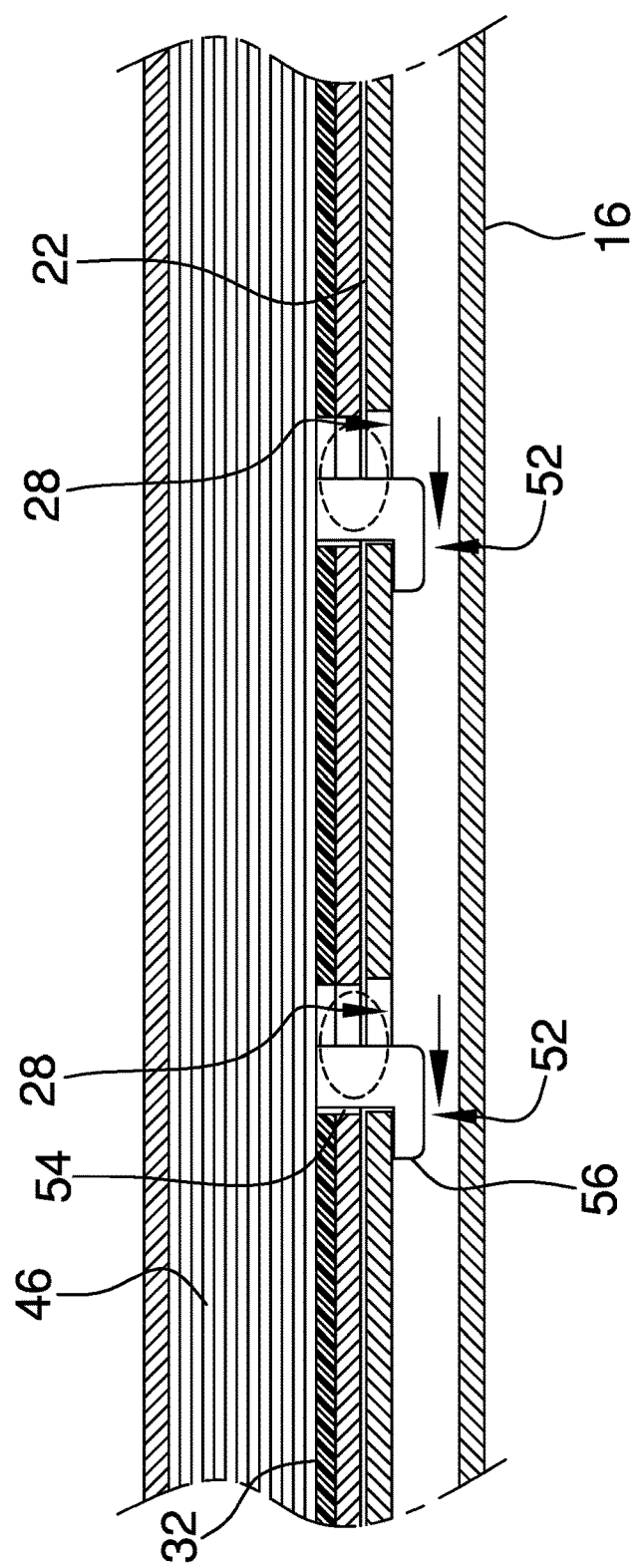
FIG. 5 is a cross sectional view taken along line 5-5 of FIG. 4 of an embodiment of the disclosure.

With reference now to the drawings, and in particular to FIGS. 1 through 5 thereof, a new shield device embodying the principles and concepts of an embodiment of the disclosure and generally designated by the reference numeral 10 will be described.

As best illustrated in FIGS. 1 through 5, the rain shield system 10 generally comprises a vehicle 12 that has a doorway 14 and a door 16. The doorway 14 has an outwardly facing edge 18 and the outwardly facing edge 18 has an upper side 20. The door 16 has an inwardly facing surface 22, a top side 24 and a front side 26. The top side 24 may curve downwardly toward the front side 26 and the inwardly facing surface 22 has a pair of apertures 28 extending into an interior of the door 16. Each of the apertures 28 is aligned with an intersection between the top side 24 and the front side 26. The vehicle 12 may be a passenger vehicle, a commercial vehicle or any other on-road vehicle.

A shield 30 is provided and the shield 30 is coupled to the vehicle 12. The shield 30 is selectively positioned in a deployed position to extend between the doorway 14 and the door 16 when the door 16 is opened. In this way shield 30 is configured to shield 30 an interior of the vehicle 12 from rain.

The shield 30 comprises a first member 32 that has a first end 34, a second end 36 and an outer surface 38 extending therebetween. The first member 32 is curved between the first end 34 and the second end 36 and the outer surface 38 has a front side 40, a back side 42 and a bottom side 44. A membrane 46 is coupled to the back side 42 of the first member 32 and the membrane 46 has a distal edge 48 with respect to the first member 32. The distal edge 48 is coupled to the upper side 20 of the doorway 14 and the membrane 46 has a plurality of pleats 50. The pleats 50 are spaced apart from each other and are distributed between the distal edge 48 and the first member 32. The membrane 46 is comprised of a fluid impermeable material.

A pair of locks 52 is provided and each of the locks 52 is slidably coupled to the first member 32. Each of the locks 52 is positioned on the front side 26 of the first member 32 and each of the locks 52 comprises a leg 54 and a foot 56. The foot 56 corresponding to each of the locks 52 is spaced from the front side 26. Each of the locks 52 extends through an associated one of the apertures 28 and the foot 56 corresponding to each of the locks 52 engages the door 16. In this way the membrane 46 is stretched between the door 16 and the doorway 14 when the door 16 is opened to block rain. The membrane 46 is collapsed between the door 16 and the doorway 14 when the door 16 is closed.

A pair of buttons 58 is provided and each of the buttons 58 is coupled to an associated one of the locks 52. Each of the buttons 58 is slidably positioned on the bottom side 44 of the first member 32. Each of the buttons 58 is selectively manipulated to urge the foot 56 corresponding to the associated lock to disengage the door 16. In this way the first member 32 and the membrane 46 are released from the door 16.

In use, the first member 32 is manipulated to facilitate each of the locks 52 to engage the door 16. Thus, the membrane 46 is stretched between the door 16 and the doorway 14 when the door 16 in opened. In this way the membrane 46 shield 30s a driver from rain when the driver is entering and exiting the vehicle 12. The membrane 46 is collapsed between the door 16 and the doorway 14 when the door 16 is closed. Each of the buttons 58 is selectively manipulated to facilitate each of the locks 52 to disengage the door 16. In this way the first member 32 and the membrane 46 are released from the door 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A rain shield system comprising:
    a vehicle having a doorway and a door, said door having a pair of apertures;
    a shield being coupled to said vehicle, said shield being selectively positioned in a deployed position having said shield extending between said doorway and said door when said door is opened wherein said shield is configured to shield an interior of said vehicle from rain, said shield comprising a first member having a first end, a second end and an outer surface extending therebetween, said first member being curved between said first end and said second end, said outer surface having a front side, a back side and a bottom side, said shield comprising a membrane coupled to and extendable from said first member;
    a pair of locks, each of said locks being slidably coupled to said first member, each of said locks being positioned on said front side, each of said locks comprising a leg and a foot, said foot corresponding to each of said locks being spaced from said front side, each of said locks extending through an associated one of said apertures having said foot corresponding to each of said locks engaging said door such that said membrane is stretched between said door and said doorway when said door is opened wherein said shield is configured to block rain, said membrane being collapsed between said door and said doorway when said door is closed.

2. The assembly according to claim 1, wherein:
    said doorway has an outwardly facing edge, said outwardly facing edge having an upper side; and
    said door has an inwardly facing surface, a top side and a front side, said top side curving downwardly toward said front side, said pair of apertures being positioned on said inwardly facing surface, each of said apertures extending into an interior of said door, said pair of apertures being aligned with an intersection between said top side and said front side.

3. The assembly according to claim 1, further comprising:
    said membrane being coupled to said back side of said first member, said membrane having a distal edge with respect to said first member, said distal edge being coupled to said upper side of said doorway, said membrane having a plurality of pleats, said pleats being spaced apart from each other and being distributed between said distal edge and said first member.

4. The assembly according to claim 1, further comprising a pair of buttons, each of said buttons being coupled to an associated one of said locks wherein each of said buttons is configured to be manipulated, each of said buttons urging said foot corresponding to said associated lock to disengage said door thereby facilitating said membrane to be released from said door.

5. A rain shield system comprising:
    a vehicle having a doorway and a door, said doorway having an outwardly facing edge, said outwardly facing edge having an upper side, said door having an inwardly facing surface, a top side and a front side, said top side curving downwardly toward said front side, said inwardly facing surface having a pair of apertures, each of said apertures extending into an interior of said door, said of said apertures being aligned with an intersection between said top side and said front side,
    a shield being coupled to said vehicle, said shield being selectively positioned in a deployed position having said shield extending between said doorway and said door when said door is opened wherein said shield is configured to shield an interior of said vehicle from rain, said shield comprising:
        a first member having a first end, a second end and an outer surface extending therebetween, said first member being curved between said first end and said second end, said outer surface having a front side, a back side and a bottom side,
        a membrane being coupled to said back side of said first member, said membrane having a distal edge with respect to said first member, said distal edge being coupled to said upper side of said doorway, said membrane having a plurality of pleats, said pleats being spaced apart from each other and being distributed between said distal edge and said first member,
        a pair of locks, each of said locks being slidably coupled to said first member, each of said locks being positioned on said front side, each of said locks comprising a leg and a foot, said foot corresponding to each of said locks being spaced from said front side, each of said locks extending through an associated one of said apertures having said foot corresponding to each of said locks engaging said door such that said membrane is stretched between said door and said doorway when said door is opened wherein said shield is configured to block rain, said membrane being collapsed between said door and said doorway when said door is closed, and a pair of buttons, each of said buttons being coupled to an associated one of said locks wherein each of said buttons is configured to be manipulated, each of said buttons urging said foot corresponding to said associated lock to disengage said door thereby facilitating said membrane to be released from said door.

\* \* \* \* \*